United States Patent [19]

Wolfe, Jr.

[11] Patent Number: 4,801,647

[45] Date of Patent: Jan. 31, 1989

[54] THERMOPLASTIC ELASTOMERIC COMPOSITIONS

[75] Inventor: James R. Wolfe, Jr., Wilmington, Del.

[73] Assignee: E. I. Du Pont de Nemours and Company, Wilmington, Del.

[21] Appl. No.: 166,486

[22] Filed: Mar. 10, 1988

[51] Int. Cl.$^4$ .................. C08L 51/04; C08L 51/06; C08L 23/26; C08L 23/16

[52] U.S. Cl. ........................ 525/74; 525/75; 525/78; 525/81; 525/84; 524/504

[58] Field of Search ............... 525/74, 75, 78, 81

[56] References Cited

U.S. PATENT DOCUMENTS

| | | | |
|---|---|---|---|
| 4,555,546 | 11/1985 | Patel | 525/194 |
| 4,612,155 | 9/1986 | Wong et al. | 525/74 |
| 4,678,834 | 7/1987 | Bowin et al. | 525/74 |

FOREIGN PATENT DOCUMENTS 60-047043  3/1985  Japan ...................... 525/74

Primary Examiner—Carman J. Seccuro

[57] ABSTRACT

A thermoplastic elastomeric composition comprising a dynamically crosslinked grafted polyolefin copolymer elastomer and a thermoplastic crystalline polyolefin is disclosed. The crosslinked elastomer is dispersed in the thermoplastic crystalline polyolefin which is present as the continuous phase. The grafted elastomer is ethylene/propylene/diene terpolymer or ethylene/propylene copolymer grafted with fumaric acid, maleic acid, maleic anhydride or derivatives thereof capable of reacting with diamine crosslinking agents.

15 Claims, No Drawings

4,801,647

THERMOPLASTIC ELASTOMERIC COMPOSITIONS

BACKGROUND OF THE INVENTION

Field of the Invention

The present invention relates to a dynamically cured blend of a grafted elastomeric polyolefin copolymer and a thermoplastic crystalline polyolefin.

European Patent Application No. 0014018 discloses grafted elastomeric polyolefin copolymer which optionally may be blended with another polymer such as polyethylene, polyamides or vinyl polymers. No curatives are added. In the examples the preferred blending polymer is polypropylene which has been grafted with maleic acid at the same time the elastomeric copolymer is grafted with maleic acid. Such compositions are not very useful as thermoplastic elastomers due to their poor resistance to compression set.

Thermoplastic elastomer compositions consisting of blends of polyolefin resin and cured EPDM elastomer are known, U.S. Patent No. 4,130,535. Such blends have a number of limitations due to the curatives used to crosslink the EPDM elastomer. Free-radical curing system initiated by high-energy radiation or by peroxides tend to crosslink polyethylene when it is the polyolefin resin resulting in impaired thermoplastic processability and tend to degrade polypropylene resin when it is the polyolefin resulting in a reduction of the strength of the composition. Sulfur vulcanization systems exhibit unpleasant odors, bloom, and provide compositions with less than optimal resistance to oil swell and compression set. It is disclosed in U.S. Pat. 4,311,628 that the above shortcomings can be overcome by the use of phenolic curatives to crosslink the EPDM component of the blends. Such compositions require the use of metal oxides and halides as cure promoters. The presence of metal derivatives can result in less than optimal water resistance and can contribute to poor electrical properties particularly poor wet electrical properties. None of the above inventions are effective for preparing thermoplastic compositions of noncrosslinked polyolefin resin and crosslinked EPM rubber. It has now been discovered that improved thermoplastic compositions of noncrosslinked polyolefin resin and crosslinked EPDM or EPM elastomer can be prepared by using grafted EPDM or EPM as the elastomer and employing diamines or polyamines as the curatives to crosslink the elastomer.

SUMMARY OF THE INVENTION

The present invention is a thermoplastic elastomeric composition comprising a dynamically crosslinked grafted polyolefin copolymer elastomer and a crystalline polyolefin resin. The crosslinked elastomer is dispersed in the polyolefin resin. The grafted elastomer is ethylene/propylene/diene terpolymer or ethylene/propylene copolymer grafted with fumaric acid, maleic acid, maleic anhydride or derivatives thereof capable of reacting with diamine crosslinking agents, for example, half acid esters such as ethyl hydrogen maleate. The polyolefin is polyethylene or polypropylene or crystalline copolymers consisting substantially of polyethylene or polypropylene.

DETAILED DESCRIPTION

The thermoplastic elastomeric compositions of the present invention comprise 15 to 85 parts, preferably 20 to 75 parts, by weight of crystalline polyolefin resin and 15 to 85 parts, preferably 25 to 80 parts, by weight of crosslinked grafted polyolefin copolymer elastomer. The crystalline polyolefin resin used in the present invention is polyethylene, polypropylene or copolymers thereof. The terms "polyethylene" and "polypropylene" as used herein are intended to include, in addition to the homopolymers, those polymers that also contain minor amounts, usually not greater than 15 weight percent, of higher alpha-olefins, e.g., those containing 3–8 carbon atoms, e.g., butene, octene, etc. The polyethylene and the polypropylene polymers used in this invention have melt indices in the range of from about 0.07–80 dg/min. Polypropylene is the preferred resin because of the superior properties it imparts to the composition, especially improved heat resistance.

The grafted polyolefin copolymer elastomer is an ethylene/propylene/diene terpolymer containing from 40 to 80 weight percent ethylene, from 18 to 58 weight percent propylene, from 2 to 15 weight percent diene monomer, and having grafted thereto from 0.2 to 10 weight percent, preferably from 0.5 to 5 weight percent, maleic acid, fumaric acid, maleic anhydride, or derivatives thereof capable of reacting with diamine crosslinking agents. The diene monomer is a non-conjugated diene containing 6–12 carbon atoms. The preferred dienes are those having a structure such that only one double bond is incorporated in the polymer and the other is freely available for conversion with the unsaturated discarboxylic acid. Double bonds that are readily incorporated into the polymer chain are terminal, not sterically hindered double bonds, or double bonds in a strained ring system such as a norbornene ring. Examples of such compounds are 1,4-hexadiene, 1,5-heptadiene, 2-propenylnorbornene and 2-butenylnorbornene. Methods for preparing the grafted polyolefin copolymer elastomer from ethylene/propylene/diene terpolymer are disclosed in U.S. Pat. No. 4,010,223.

Alternatively the grafted polyolefin copolymer elastomer can be a copolymer of ethylene and propylene containing from 40 to 80 weight percent ethylene, from 20 to 60 weight percent propylene and having grafted thereto from 0.2 to 10 weight percent, preferably 0.5 to 5 weight percent, maleic acid, fumaric acid, maleic anhydride, or derivatives thereof capable of reacting with diamine crosslinking agents. Methods for preparing the grafted polyolefin copolymer elastomer from ethylene/propylene copolymer elastomer are disclosed in U.S. Pat. No. 4,134,927.

An important feature of the present invention is the necessity of dynamically crosslinking the grafted polyolefin copolymer elastomer, usually, and most preferably, in the presence of the polyolefin resin. Dynamic crosslinking is carried out using one or more diamines or polyamines or precursors thereof such as methylenedianiline; 1,6-hexanediamine or its carbamate; meta-xylene-alpha,alpha,-diamine; 2-methyl-1,5-diaminopentane; triethylenetetramine; diethylenetriamine; bis(para-aminocyclohexyl)methane; and ethylenediamine. The amount of crosslinking agent employed will vary over a wide range. Typically, such amounts of crosslinking agents range from about 0.1 to 5 parts by weight, usually 0.1 to 2 parts by weight of total polymer in the composition. Although the amount of crosslinking agent used can be more than 5 parts by weight, there is no advantage in using larger amounts. The amount of crosslinking agent and grafted monomer are chosen such that compositions with polypropylene as the polyolefin resin have compression sets less than 80% and compositions with polyethylene as the polyolefin resin having compression sets less than 70% after 22 hours at 70° C. when measured using method B of ASTM D395-84. As is the usual practice when crosslinking (curing), optionally conventional promoters such as di-ortho-tolylguanidine, diphenylguanidine, or the like can be used.

The multi-phase melt processible thermoplastic composition is prepared by mixing the crystalline polyolefin resin, the uncrosslinked grafted polyolefin copolymer elastomer, and crosslinking agent, by any one of a number of well known procedures for mixing elastomers, for example, in a Banbury mixer, or in an extruder. The mixing is performed at a temperature high enough to soften the polymers for adequate mixing, but not so high as to degrade the polymers. Generally, mixing is performed at temperatures of from about 100–280° C., usually about 125°–230° C. Crosslinking is conducted during mixing and shearing so as to dynamically crosslink the grafted polyolefin copolymer elastomer. Mixing and shearing are carried out for a time sufficient to allow for dynamically crosslinking the grafted polyolefin copolymer elastomer and for comminuting the crosslinked elastomer resulting in the elastomer being dispersed throughout the crystalline polyolefin resin. Adequacy of mixing can be determined by observing the processability of the compositions by means of a piston rheometer. If the degree of mixing is inadequate, as indicated by poor extrudability at processing temperatures, additional mixing at the original mixing temperature or at lower temperatures can be employed to further comminute and disperse the resultant dynamically crosslinked grafted polyolefin copolymer elastomer in the crsytalline polyolefin resin so as to obtain satisfactory thermoplastic processability. The crystalline polyolefin resin is not crosslinked otherwise thermoplastic processability would be impaired.

Although fillers and compounding ingredients are not essential components of the thermoplastic composition of this invention, preferably, especially from a cost standpoint, various amounts of conventional fillers and/or compounding ingredients normally used with elastomers are admixed with the compositions of this invention. Examples of such ingredients include extending oils, e.g., aromatic oils, paraffinic oils or naphthenic oils; inorganic fillers, such as various carbon blacks, clays, silica, alumina, calcium carbonate; pigments, such as titanium dioxide; antioxidants; antidegradants; processing aids such as lubricants and waxes; and plasticizers such as dialkylphthalates, trialkylmellitates and dialkyladipates. It is preferable to add processing oils and/or plasticizers and inorganic fillers to the thermoplastic composition to improve its processing characteristics and the particular amounts used depend, at least in part, upon the quantities of other ingredients in the composition and the desired properties of the composition. Generally, amounts from about 5 to 50 parts by weight based on total polymers of fillers can be used and 10 to 100 parts by weight based on total weight of polymers of compounding ingredients such as processing oils and plasticizers can be used.

For use in wire insulation it is important that the compositions have good electrical properties, and in particular, good wet electrical properties for use outdoors or for use in other applications where water is present. In such applications it can be helpful to employ as fillers materials which are hydrophobic. Hydrophobic clay fillers and other methods for improving wet electrical properties of EPDM elastomer compositions are discussed in an article by J. R. Wolfe, Jr. and I. D. Roche, "Optimizing Electrical Properties of Ethylene-propylene Terpolymers", Rubber World, 149 (2), 62 (1963).

The melt processible thermoplastic compositions of the subject invention can be processed using conventional plastic processing equipment. Articles molded from the thermoplastic compositions of the present invention exhibit properties generally only associated with vulcanized rubber. For exmaple, compositions of the present invention usually have tensile strength values of about 9 to 25 MPa and elongation at break values of about 150 to 700%. Various uses for the thermoplastic elastomer compositions include wire insulation and coverings, seals and gaskets, automotive parts, sheet liners and packaging films. Further, melt processable thermoplastic compositions within the scope of this invention can be fabricated into tubing for laboratory, medical, and industrial uses. Such tubing can also be used as the inner tube of reinforced hoses, wherein the extruded tube is overlaid with wire or textile cords, applied as a spiral, knit or braid. Optionally, a polymeric covering can be applied (extruded, spiral wound or calendered sheet) over the reinforced tubing to provide protection from the working environment and mechanical abuse. Compositions within the scope of this invention can be used as the protective covering of reinforced tubes of similar or different composition.

EXAMPLES

General procedures used to prepare compositions

The polymers to be mixed were charged to a Haake Rheocord Torque Rheometer, Rheocord Model 600, equipped with cam-style baldes and preheated to the mixing temperature noted in the examples. The polymers were mixed until the temperature of the polymer rose to the mixing temperature noted in the examples after which mixing and shearing were continued for the times noted in the examples. The temperature of the polymer mixture usually rose above the preset mixing temperature during the mixing and shearing procedure. A nitrogen atmosphere was maintained in the mixing chamber while the polymers were being mixed and sheared. The polymer mixture was removed from the Haake mixer and then reinserted and remixed and sheared as noted.

Polymer Test Methods

The test specimens were cut from slabs compression molded at the temperatures specified in the examples. The test methods used were:
  tensile strength at break at 8.5 mm/s: ASTM D412
  elongation at break at 8.5 mm/s: ASTM D412
  compression set after 22 hr/70° C., method B: ASTM D395 Stress-strain measurements were run on test specimens approximately 0.6 mm in thickness using nonstandard dumbbells having the following dimensions using the standard dumbbell nomenclature of ASTM D412: A=13 mm, C=83 mm, L=44 mm, W=6.4 mm. Compression sets were measured using 13 mm diameter discs died out of about 2 mm thick slabs piled up to a thickness of about 12.5 mm. All tests were run in duplicate or triplicate.

Polymers Employed

The ethylene/propylene/diene terpolymer (EPDM) grafted with fumaric acid (EPDM +F.A. graft) was prepared from narrow molecular EPDM terpolymer of number average molecular weight 186,000 having the composition before grafting of, by weight, 70% ethylene/26% propylene/3.7% 1,4-hexadiene terpolymer. The EPDM +F.A. graft contains, by weight, 1.7% of grafted units (calculated as maleic anhydride) and has a melt flow of 280° C. of 3.0 dg/min.

The polypropylene is an isotactic homopolymer having a melt flow rate (ASTM D1238) at 230° C. of 0.8 dg/min and a density of 0.9 g/cm$^3$. The polyethylene employed is a homopolymer having a melt index of 2.9 dg/min and a density of 0.958 g/cm$^3$.

EXAMPLES 1-7

A series of thermoplastic compositions were prepared from crystalline polypropylene homopolymer, and ethylene/propylene/diene terpolymer grafted with fumaric acid. The compositions were prepared by mixing and shearing the polypropylene in the Haake mixer for 4 minutes at 100 rpm and 180° C., adding the ethylene/propylene/diene terpolymer grafted with fumaric acid and mixing and shearing for 4 minutes, adding 1.2 parts per hundred parts total polymer of hexamethylenediamine carbamate and 6 parts of 1,3-di-ortho-tolylguanidine and mixing and shearing for 10 minutes. After removal and reinsertion of the composition in the Haake mixer it was remixed and sheared for 2 minutes at 100 rpm and 180° C. The relative proportions of the polymers in the various compositions and the properties of the compositions measured after compression molding at 220° C. are listed in Table 1 as compositions 1C-7C. Compositions 1C-7C are representative of the current invention.

Similar compositions were prepared in the absence of crosslinking agents in the following manner. The polypropylene was mixed and sheared in the Haake mixer for 4 minutes at 100 rpm and 180° C. The ethylene/propylene/diene terpolymer grafted with fumaric acid was added and the mixture mixed and sheared for 14 minutes. The mixture was removed from the Haake mixer, reinserted, and remixed and sheared for 2 minutes at 100 rpm and 180° C. The relative proportions of the polymers in the blends and the properties of the blends measured after compression molding at 220° C. are listed in Table 1 as compositions 1N-7N. Compositions 1N-7N are present for comparison purposes only and are not representative of the present invention. Compositions 1C-7C which are representative of the present invention excel relative to compositions 1N-7N in resistance to compression set and in tensile strength. Despite the presence of crosslinked polymer in compositions 1C-7C, they are easily remolded demonstrating their thermoplastic character.

TABLE 1

| Sample | EPDM + F.A. Graft Parts | Polypropylene Parts | Comp. Set 22 hr/70° C. % | Tensile Strength MPa | Elongation % |
|---|---|---|---|---|---|
| 1C | 20 | 80 | 77 | 21 | 575 |
| 1N | 20 | 80 | 89 | 16 | 285 |
| 2C | 30 | 70 | 77 | 21 | 485 |
| 2N | 30 | 70 | 89 | 15 | 225 |
| 3C | 40 | 60 | 70 | 20 | 500 |
| 3N | 40 | 60 | 90 | 16 | 625 |
| 4C | 50 | 50 | 64 | 21 | 500 |
| 4N | 50 | 50 | 100+ | 13 | 535 |
| 5C | 60 | 40 | 61 | 17 | 415 |
| 5N | 60 | 40 | 100+ | 10 | 455 |
| 6C | 70 | 30 | 38 | 15 | 405 |
| 6N | 70 | 30 | 100+ | 8.0 | 505 |
| 7C | 80 | 20 | 32 | 9.8 | 300 |
| 7N | 80 | 20 | 100+ | 7.5 | 815 |

Examples 8-14

Compositions 8C-14C and 8N-14N were prepared in the same manner as compositions 1C-7C and 1N-7N respectively except polyethylene was used in place of polypropylene. The relative proportions of the polymers in the compositions and their properties after compression molding at 220° C. are listed in Table 2. Compositions 8N-14N which are present for comparison purposes only are not representative of the present invention. Compositions 8C-14C which are representative of the present invention excel relative to compositions 8N-14N in resistance to compression set and are equivalent or superior in tensile strength. Despite the presence of crosslinked polymer in compositions 8C-14C, they are easily remolded demonstrating their thermoplastic character.

TABLE 2

| Sample | EPDM + F.A. Graft Parts | Polyethylene Parts | Comp. Set 22 hr/70° C. % | Tensile Strength MPa | Elongation % |
|---|---|---|---|---|---|
| 8C | 20 | 80 | 58 | 13 | 160 |
| 8N | 20 | 80 | 71 | 11 | 65 |
| 9C | 30 | 70 | 52 | 15 | 620 |
| 9N | 30 | 70 | 72 | 10 | 75 |
| 10C | 40 | 60 | 41 | 18 | 640 |
| 10N | 40 | 60 | 78 | 8.2 | 120 |
| 11C | 50 | 50 | 40 | 17 | 540 |
| 11N | 50 | 50 | 76 | 9.9 | 665 |
| 12C | 60 | 40 | 33 | 14 | 415 |
| 12N | 60 | 40 | 86 | 11 | 740 |
| 13C | 70 | 30 | 25 | 15 | 440 |
| 13N | 70 | 30 | 91 | 14 | 910 |
| 14C | 80 | 20 | 23 | 11 | 415 |
| 14N | 80 | 20 | 98+ | 11 | 885 |

I claim:

1. A melt processable thermoplastic composition comprising a blend of:
   (a) 15 to 85 parts by weight of a noncrosslinked crystalline polyolefin resin consisting essentially of polymerized monomer units of ethylene or propylene or mixtures thereof and up to about 15 weight percent of a higher olefin containing up to about 8 carbon atoms,
   (b) 15 to 85 parts by weight of a crosslinked grafted copolymer elastomer made from dynamically crosslinking using a diamine or polyamine curative an ethylene/propylene/diene terpolymer or an ethylene/propylene copolymer containing 40 to 80 weight percent ethylene grafted with 0.2 to 10 weight percent maleic acid, fumaric acid, maleic anhydride, or esters thereof, the dynamically crosslinked grafted copolymer elastomer being dispersed throughout the crystalline polyolefin resin.

2. A melt processable thermoplastic composition of claim 1 wherein the crystalline polyolefin resin comprises polymerized monomer units of ethylene and the composition has a compression set below 70%.

3. A melt processable thermoplastic composition of claim 1 wherein the crystalline polyolefin resin comprises polymerized monomer units of propylene and the composition has a compression set below 80%.

4. A melt processable thermoplastic composition of claim 1 wherein the grafted copolymer elastomer is a grafted ethylene/propylene/diene terpolymer.

5. A melt processable thermoplastic composition of claim 4 wherein the crystalline polyolefin resin comprises polymerized monomer units of propylene and the composition has a compression set below 80%.

6. A melt processable thermoplastic composition comprising a blend of
   (a) 20 to 75 parts by weight of a noncrosslinked crystalline polyolefin resin consisting essentially of polymerized monomer units of ethylene or propylene or mixtures thereof and up to about 15 weight percent of a higher olefin containing up to about 8 carbon atoms, and
   (b) 25 to 80 parts by weight of a crosslinked grafted copolymer elastomer made from dynamically crosslinking using a diamine or polyamine curative an ethylene/propylene/diene terpolymer grafted with 0.5 to 5 weight percent of fumaric acid, the dynamically crosslinked grafted copolymer elastomer being dispersed throughout the crystalline polyolefin resin.

7. A melt processable thermoplastic composition of claim 6 where the diene is 1,4-hexadiene.

8. A melt processable thermoplastic composition of claim 7 wherein the polyolefin resin comprises polymerized monomer units of propylene and the composition has a compression set below 80%.

9. A process for making a melt processable thermoplastic composition comprising a blend of a crystalline polyolefin resin and a dynamically crosslinked elastomer which comprises:
(1) adding to a mixer
   (a) 25 to 85 parts by weight of crystalline polyolefin resin consisting essentially of polymerized monomer units of ethylene, propylene or mixtures thereof and up to about 15 weight percent of a higher olefin containing up to about 8 carbon atoms,
   (b) 15 to 85 parts by weight of an uncrosslinked grafted polyolefin copolymer elastomer comprising an ethylene/propylene/diene terpolymer or ethylene/propylene copolymer containing 40 to 80 weight percent ethylene and grafted with 0.2 to 10 weight percent of maleic acid, fumaric acid, maleic anhydride, or esters thereof.
   (c) a diamine or polyamine crosslinking agent for the grafted polyolefin copolymer elastomer, and
(2) mixing and shearing the composition at a temperature sufficient to soften the polyolefin resin and to dynamically crosslink said elastomer resulting in the crosslinked elastomer being dispersed through the crystalline polyolefin resin.

10. A process for making a melt processable thermoplastic composition of claim 9 which comprises adding to the mixer the crystalline polyolefin resin polyethylene.

11. A process for making a melt processable thermoplastic composition of claim 9 which comprises adding to the mixer the crystalline polyolefin resin polypropylene.

12. A process for making a melt processable thermoplastic composition of claim 9 which comprises adding to the mixer an uncrosslinked ethylene/propylene/diene terpolymer elastomer grafted with fumaric acid.

13. A process for making a melt processable thermoplastic composition comprising a blend of a crystalline polyolefin resin and a dynamically crosslinked elastomer which comprises:
(1) adding to a mixer
   (a) 20 to 75 parts by weight of crystalline polyolefin resin consisting essentially of polymerized monomeric units of ethylene, propylene or mixtures thereof and up to about 15 weight percent of a higher olefin containing about 8 carbon atoms,
   (b) 25 to 80 parts by weight of an uncrosslinked grafted polyolefin copolymer elastomer comprising an ethylene/propylene/diene terpolymer containing 40 to 80 weight percent ethylene and grafted with 0.5 to 5 weight percent of fumaric acid.
   (c) a diamine or polyamine crosslinking agent for the grafted polyolefin copolymer elastomer, and
(2) mixing and shearing the composition at a temperature sufficient to soften the polyolefin resin and to dynamically crosslink said elastomer resulting in the crosslinked elastomer being dispersed throughout the crystalline polyolefin resin.

14. A process for making a melt processable thermoplastic composition of claim 13 wherein the polyolefin resin is polypropylene.

15. A process for making a melt processable thermoplastic composition of claim 13 wherein the diene is 1,4-hexadiene.

* * * * *